United States Patent Office 2,849,473
Patented Aug. 26, 1958

2,849,473

(CYCLOHEXEN-3-YL-1)-ETHYLSILOXANE BIS(DIMETHYL SILOXANE) CYCLIC TRIMER

Donald L. Bailey, Snyder, and William T. Black, Buffalo, N. Y., assignors to Union Carbide Corporation, a corporation of New York No Drawing. Application October 31, 1955
Serial No. 544,038

2 Claims. (Cl. 260—448.2)

This invention relates to polymerization reactions and has for an object the provision of a novel chemical compound in the form of a cyclosiloxane polymer; novel compositions of matter consisting essentially of mixtures of cyclosiloxane polymers; chemical products in the form of oils, fluid, gums and similar substances useful as intermediates in polymerization reactions and processes, and including (a) linear siloxane polymers comprised of siloxane groupings of the cyclosiloxane polymer of the invention, (b) copolymers or mixed polymers comprised of organic molecular units or monomers and siloxane groupings of the cyclosiloxane polymer of the invention, and (c) homopolymers obtained by addition polymerization of the cyclosiloxane polymer of the invention; and plastic substances in which linear polymers are cross-linked through an unsaturated group of the cyclosiloxane polymer of the invention. In particular, the invention contemplates the provision of a relatively short-chain, well defined, low molecular weight cyclic trisiloxane of mixed aliphatic-aromatic composition, wherein the substituent groups consist of methyl, ethyl and the unsaturated cyclic radical, cyclohexenyl, in the form, 1-cyclohexenyl-1-ethyl-3,3,5,5-tetramethylcyclotrisiloxane [cyclohexenylethyl siloxane bis (dimethyl siloxane) cyclic trimer], as represented by the structural formula:

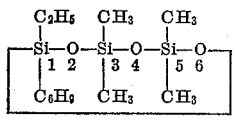

and the isomeric forms thereof, which may be represented, also, by the formulae,

It is now well established in industry that many useful organosilicon compounds may be prepared by bonding various saturated organic groups or atoms to silicon atoms, and, that compounds thus prepared can be hydrolyzed to form a corresponding organosilanol which, in turn, may be dehydrated to form polymeric silicon oxides or siloxanes. Siloxane polymers containing the unsaturated olefinic bond in at least one substituent group form a distinct and highly useful class of compounds by reason of the fact that they may be crosslinked readily through their reactive organic substituent or substituents in the formation of higher molecular weight polymers, or copolymers by reaction with other organic olefinic materials. Furthermore, the reactivity of such a silicon-bonded unsaturated group permits the application of specialized curing techniques, other than conventional condensation procedures, to polymeric molecules containing unsaturation of this type, such, for example, as in preparation of silicone rubbers. Silicon-bonded unsaturated reactivity can be incorporated into high molecular weight siloxanes by conventional chlorosilane cohydrolysis procedures, but for many applications these techniques are not entirely satisfactory. Thus the incorporation and uniform distribution of very small amounts of unsaturated groups within a polymer, which is essential for controlled crosslinking applications, would be difficult to control in cohydrolysis. Furthermore, in lieu of crude cohydrolyzates, a particular process or reaction may require individual low molecular weight, pure siloxanes as starting materials either for reasons of economy or because of the desired mechanism of reaction sought, and the compound of the present invention is ideally suited for this purpose, in that, it is a well defined, pure compound of known structure, and is monofunctional with respect to unsaturation such that its polymers, prepared through cyclic-olefinic addition may be controlled to avoid extensive and undesirable crosslinking. We have found that the cyclo-olefine substituent group of the compound of the present invention, cyclohexenyl, demonstrates all of the usual olefine reactions. Furthermore, it is believed that the cyclo-olefine group should be slightly more reactive than the conventional open-chain type of unsaturated groups found in similar siloxane derivatives presently known in industry, since the ring structure should facilitate opening of the double bond. The compound of the invention is ideally suited for use as an intermediate in the preparation of olefine-modified silicones and silicone rubbers, and in the preparation of useful copolymers with organic monomers.

While the compound of the invention is essentially a polymer when considered independently as a chemical compound, it functions as a monomer when employed in the production of linear polymers, forming a monomeric constituent of the polymer chains comprising oils or fluids, gums and other intermediates suitable for use in carrying out further polymerization reactions. The compound provides for effective controlled crosslinking between and among linear polymers and copolymers through the agency of the unsaturated cyclohexenyl group contained therein.

Preparation of the novel aliphatic-aromatic cyclosiloxane polymer of the invention may be effected by conventional procedures involving cohydrolysis of cyclohexenylethyldichlorosilane and dimethyldichlorosilane in a dilute aqueous-ethereal solution, followed by distillation for recovery of the pure compound.

The invention may be best understood by reference to the following specific examples of typical preparations and recoveries of our novel compound and compositions of matter containing the same:

EXAMPLE I

*Preparation of 1-cyclohexenyl-1-ethyl-3,3,5,5-tetramethylcyclotrisiloxane*

Dimethyldichlorosilane [$Me_2SiCl_2$], in amount 550 grams, $\Delta^3$-cyclohexenylethyldichlorosilane (prepared by reacting butadiene with vinylethyldichlorosilane) in amount 148.1 grams, and 250 cc. of diisopropyl ether were mixed and slowly added to 1000 cc. of diisopropyl ether and 500 cc. of water in a flask.

The dichlorosilanes were added slowly to the refluxing mixture of ether and water, and, thereafter, the material was refluxed for two (2) hours. The ethereal layer was separated and refluxed for two (2) hours over sodium bicarbonate ($NaHCO_3$). The solution was then cooled and washed with water until neutral to pH paper. The ether was removed under reduced pressure and the material was distilled for separation of the distillable products.

The distillate as obtained above, was redistilled twice for separation and recovery of the pure compound, 1- cyclohexenyl - 1 - ethyl - 3,3,5,5 - tetramethylcyclotrisiloxane, which showed the following physical properties:

|  | Found | Theor. |
|---|---|---|
| Density ($d_4^{25}$) | 0.990 |  |
| Refractive index ($n_D$ at 25° C.) | 1.4431 |  |
| Molecular weight | 300.8 | 302 |
| Bromine absorption (gr. Br/100 gr. product) | 59 | 54 |
| Molar refraction | 80.7 | 81.1 |

EXAMPLE II

*Preparation of dimethyl silicone gum stock containing cyclohexenylethyl siloxy units*

The compound, 1 - cyclohexenyl-1-ethyl-3,3,5,5-tetramethylcyclotrisiloxane, was equilibrated with octamethylcyclotetrasiloxane to yield a gum stock in accordance with the following procedure:

Octamethylcyclotetrasiloxane, in amount 125 grams, 0.76 gram (1.148 mol percent) of the compound of Example I, and 0.1091 gram potassium silanolate (containing 4.0% K+) were mixed in a glass reaction vessel. The vessel was then placed in an oil bath maintained at 150° C. for sixteen (16) hours. A gum stock was obtained which showed a miniature penetrometer reading of 113 (tenths of mm./10 sec.).

COMPOUNDING

One hundred grams of the gum stock was compounded on a six inch (6″) differential speed two roll mill with 35 parts of "Santocel CS" (finely-divided silica filler) and 1.0 part of di-tertiary-butyl peroxide catalyst. The compounded material was then press-cured in a mold at 175° C. for thirty (30) minutes. The resulting elastomer had the following physical properties.

|  | Mold | Post-cured 24 hours at 250° C. |
|---|---|---|
| Tensile (p. s. i.) | 835 | 540 |
| Elongation (percent) | 800 | 475 |
| Set at Break (percent) | 18 | 16 |
| Hardness (shore A units) | 46 | 68 |

A similar dimethyl silicone gum stock which did not contain the compound of the invention when compounded in the above manner and subjected to identical press mold-curing conditions did not yield an elastomer.

Since it is considered obvious that some changes and modifications can be made in the foregoing methods and procedures without departing from the nature and spirit of our invention, it is to be understood that the invention is not to be limited to the specific details offered by way of illustration above, except as set forth in the following claims.

We claim:

1. A chemical compound in the form of a cyclosiloxane polymer consisting of one (cyclohexen - 3 - yl-1)-ethyl siloxane unit and two dimethyl siloxane units.

2. The chemical compound 1-(cyclohexen-3-yl-1)-1-ethyl-3,3,5,5-tetramethylcyclotrisiloxane.

References Cited in the file of this patent
UNITED STATES PATENTS

| 2,600,307 | Lucas et al. | June 10, 1952 |
| 2,645,628 | Hurd | July 14, 1953 |
| 2,756,246 | Burkhard | July 24, 1956 |